United States Patent [19]

Nagashima

[11] Patent Number: 4,814,877
[45] Date of Patent: Mar. 21, 1989

[54] IMAGE READING APPARATUS PROVIDED WITH CORRECTION FOR SHADINGS IN IMAGE DATA

[75] Inventor: Nao Nagashima, Yokohama, Japan

[73] Assignee: Canon Kabushiki Kaisha, Tokyo, Japan

[21] Appl. No.: 24,925

[22] Filed: Mar. 12, 1987

Related U.S. Application Data

[63] Continuation of Ser. No. 579,587, Feb. 13, 1984, abandoned.

[30] Foreign Application Priority Data

Feb. 21, 1983 [JP] Japan .................................. 58-27299

[51] Int. Cl.4 ............................................. H04N 5/14
[52] U.S. Cl. ..................................... 358/163; 358/282
[58] Field of Search ............... 358/163, 164, 282, 284, 358/213, 167

[56] References Cited

U.S. PATENT DOCUMENTS

| | | | |
|---|---|---|---|
| 3,800,078 | 3/1974 | Cochran et al. | 358/166 |
| 4,129,853 | 12/1978 | Althauser et al. | 358/282 |
| 4,200,934 | 4/1980 | Hofmann | 358/163 |
| 4,212,072 | 7/1980 | Huelsman et al. | 358/167 |
| 4,499,547 | 2/1985 | Inuiya et al. | 358/213 |
| 4,523,229 | 6/1985 | Kanmoto | 358/284 |

FOREIGN PATENT DOCUMENTS 0112685  8/1980  Japan ................................. 358/163

Primary Examiner—James J. Groody
Assistant Examiner—David E. Harvey
Attorney, Agent, or Firm—Fitzpatrick, Cella, Harper & Scinto

[57] ABSTRACT

An image reading apparatus capable of shading correction by correcting obtained image signal of a determined number of bits with a characteristic signal of a smaller number of bits obtained from the same image reading device prior to image reading.

8 Claims, 5 Drawing Sheets

| S | Y | X | ADDRESS | Z |
|---|---|---|---------|---|
| 0 | 0 | 0 0 | 0 0 0 | 0 0 |
| 0 | 0 | 0 1 | 0 0 1 | 0 1 |
| 0 | 0 | 0 2 | 0 0 2 | 0 2 |
| 0 | 0 | 0 3 | 0 0 3 | 0 3 |
| 0 | 0 | 0 4 | 0 0 4 | 0 4 |
| 0 | 0 | 0 5 | 0 0 5 | 0 5 |
| ⋮ | ⋮ | ⋮ | ⋮ | ⋮ |
| 0 | F | 3 A | 3 F A | 3 8 |
| 0 | F | 3 B | 3 F B | 3 9 |
| 0 | F | 3 C | 3 F C | 3 B |
| 0 | F | 3 D | 3 F D | 3 C |
| 0 | F | 3 E | 3 F E | 3 D |
| 0 | F | 3 F | 3 F F | 3 F |
| 1 | 0 | 0 0 | 4 0 0 | 0 0 |
| 1 | 0 | 0 1 | 4 0 1 | 0 7 |
| 1 | 0 | 0 2 | 4 0 2 | 0 B |
| 1 | 0 | 0 3 | 4 0 3 | 0 D |
| 1 | 0 | 0 4 | 4 0 4 | 0 E |
| 1 | 0 | 0 5 | 4 0 5 | 1 1 |
| ⋮ | ⋮ | ⋮ | ⋮ | ⋮ |
| 1 | F | 3 A | 7 F A | 3 B |
| 1 | F | 3 B | 7 F B | 3 C |
| 1 | F | 3 C | 7 F C | 3 C |
| 1 | F | 3 D | 7 F D | 3 D |
| 1 | F | 3 E | 7 F E | 3 E |
| 1 | F | 3 F | 7 F F | 3 F |

FIG. 8

IMAGE READING APPARATUS PROVIDED WITH CORRECTION FOR SHADINGS IN IMAGE DATA

This application is a continuation of application Ser. No. 579,587 filed Feb. 13, 1984, now abandoned.

BACKGROUND OF THE INVENTION

1. Field of the Invention

The present invention relates to an image reading apparatus for use in an electronic file, a facsimile apparatus or the like, and more particularly to such image reading apparatus capable of providing satisfactory image signals by correcting so-called shading or fluctuation in the image signals obtained by reading an image.

2. Description of the Prior Art

It has recently become well known to read an original document with a solid-state image sensor such as a charge-coupled device and to apply various digital processing to a thus obtained analog electric signal after analog-to-digital conversion, for the purpose of storage in an optical or magnetic disk, image formation on a printer, or transmission to a distant location. In this connection, recent advances in digital technology have enabled electrical correction of the so-called shading phenomenon, or fluctuation of the output signals of a scan line of the charge-coupled device resulting from nonuniformity in the intensity of the illuminating fluorescent lamp, in the luminance distribution in the optical system and in the sensitivity of the charge-coupled device, and such correction has become an important factor in the reproduction of intermediate tones in the image. Such digital correction is generally achieved by storing corrective values, obtained by reading for example a white reference board, in a random access memory, and supplying said corrective values to a processing circuit together with digital signals which are obtained by reading an original and are to be corrected, thereby effecting corrective processing.

However, higher frequencies are more and more required in the processing due to the ever increasing frequency of the digital signals to be corrected, so that it is often not possible to provide a correspondingly fast data processing, or is necessary to use an expensive processing circuit in order to meet the requirement of complex data processing.

SUMMARY OF THE INVENTION

In consideration of the foregoing, an object of the present invention is to provide an image reading apparatus capable of shading correction adaptable flexibly to various requirements of correction.

Another object of the present invention is to provide an image reading apparatus capable of shading correction sufficiently adaptable to high speed image processing.

Still another object of the present invention is to provide an image reading apparatus capable of correcting fluctuations in the image signals using a simple structure.

Still another object of the present invention is to provide an image reading apparatus adapted for forming image signals suitable for reproducing intermediate tones.

The foregoing and other objects of the present invention, and the advantages thereof, will become fully apparent from the following description.

BRIEF DESCRIPTION OF THE DRAWINGS

FIG. 8 is a memory map of a read-only memory 25 shown in FIG. 3.

DETAILED DESCRIPTION OF THE PREFERRED EMBODIMENTS

Now the present invention will be clarified in greater detail with reference to the preferred embodiments thereof, shown in the attached drawings.

Figure 1:
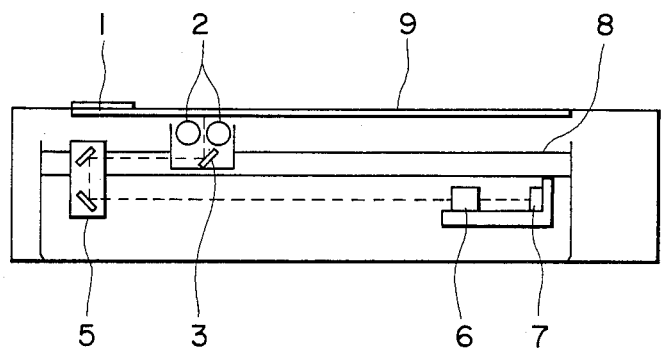
FIG. 1 is a schematic view of an original reading apparatus embodying the present invention.

At first reference is made to FIG. 1 showing, in a schematic view, an original reading apparatus to which the present invention is applicable, wherein an original document placed face down on a carriage glass 9 is illuminated with a fluorescent lamp 2 to form a reflected image on a charge-coupled device (CCD) 7 through mirrors 3, 5 and an optical lens 6, along a light path represented by broken lines. The fluorescent lamp 2 and the mirrors 3, 5 are moved along a guide rail 8 by an unrepresented motor to scan said original document placed on the carriage glass 9. The CCD 7 reads the image on the original document by converting the intensity of the reflected light from said original document, in each line, into electric signals of a determined number of pixels. In the present embodiment shading phenomena resulting from fluctuations in the light intensity of the fluorescent lamp 2, in the density caused by smears, etc., on the mirrors 3, 5 and in the light intensity distribution of the lens 7, are collectively eliminated electrically. More specifically, in the present embodiment, a shading correction plate 1, positioned outside the original placing area, is read prior to the aforementioned original scanning to correct the shading in the signals obtained by original scanning. Said shading correction plate 1 is painted uniformly, for example in white, and is used as a reference for measuring said shading phenomena.

Figure 2:
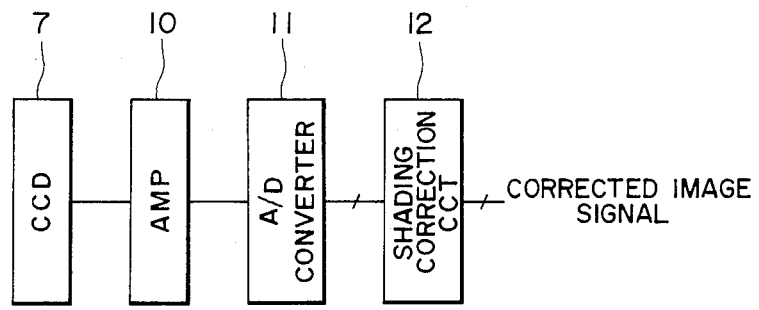
FIG. 2 is a block diagram of an electric circuit for shading correction according to the present invention.

FIG. 2 is a block diagram schematically showing an electrical circuit employed for shading correction according to the present invention.

Electric signals converted in each line from the original image in the CCD 7 are converted, after amplification in an amplifier 10, into digital signals of a determined number of bits, for example 6 bits per pixel, by an analog-to-digital (A/D) converter 11. The thus converted signals are supplied to a shading correction circuit 12 for shading correction, and further supplied to a succeeding processing circuit such as a binary digitizing circuit for black-and-white discrimination or a dither processing circuit for intermediate tone reproduction Said shading correction circuit 12 will be explained in greater detail in reference to FIGS. 3 and 4.

Figure 3:
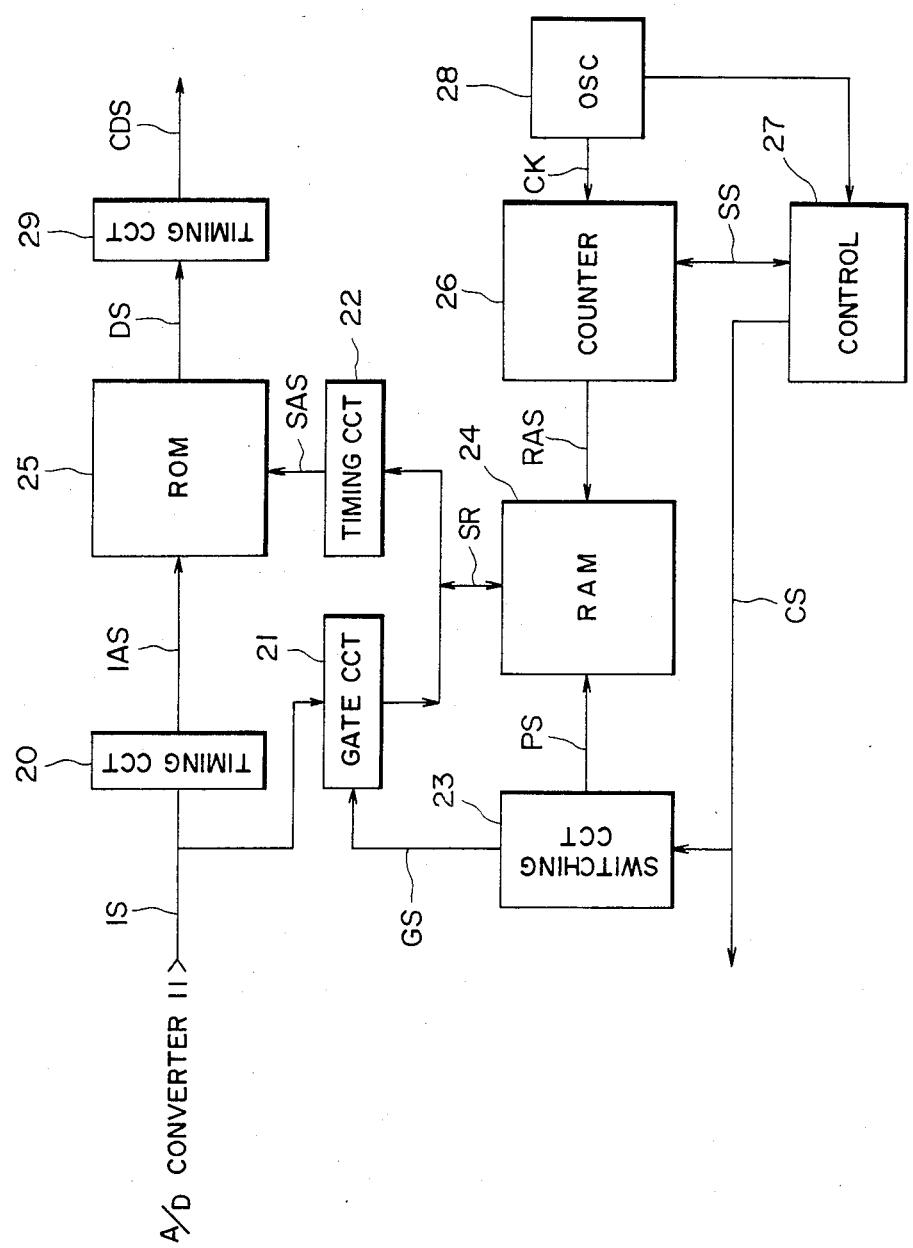
FIG. 3 is a detailed block diagram of the shading correction circuit shown in FIG. 2.

FIG. 3 shows an embodiment of the shading correction circuit 12 shown in FIG. 2.

In FIG. 3, timing circuits 20, 22, 29, composed for example of D-type flip-flops such as TTL74LS374 manufactured by Texas Instruments, control timing by retaining the input image signals in synchronization with unrepresented driving clock pulses. A gate circuit 21, capable of high-impedance output control and composed for example of TTL74LS244 manufactured by Texas Instruments, is used for supplying image signals IS from an A/D converter 11 to a random access memory (RAM) 24 when said signals are obtained as shading correction signals SR obtained by reading the shading correction plate 1. The output port of the gate circuit 21 is maintained at a high impedance during the original reading.

The RAM 24 is used for storing the shading correction signals SR obtained by reading at least a line and corresponding to image sensor elements of the CCD, and for supplying said shading correction signals in succession and in synchronization with the image signals obtained by original reading, through the timing circuit 22 to a read-only memory (ROM) 25 for shading correction therein.

The RAM 24 is composed for example of a static ROM 2147 manufactured by Intel, while the ROM 25 is composed for example of a bipolar PROM, TBP28S86 manufactured by Texas Instruments.

An oscillator circuit 28 generates timing signals for controlling the function of the shading correction circuit 12. Said oscillator circuit 28 is used also for generating timing signals for the A/D converter 11 and the CCD 7, and for generating, in a control circuit 27, various control signals CS for synchronizing various units.

A counter 26 functions in synchronization with clock signals CK supplied by the oscillator circuit 28. In the present embodiment there is employed an up-counter of which the output is cleared in response to a synchronization signal SS and is stepwise increased at the leading edge of each clock signal CK, but a down-counter may also be employed in a similar manner. The counter 26 is composed for example of TTL74LS161 manufactured by Texas Instruments.

A switching circuit 23 selects either the writing of the shading correction signals SR into the RAM 24 or the reading of the shading correction signals SR therefrom, according to a gate signal GS. In the case of writing the shading correction signals SR into the RAM 24, the gate circuit 21 is opened to supply the RAM 24 with pulse signals PS for writing the shading correction signals SR. On the other hand, in the case of reading the shading correction signals SR from the RAM 24, said gate circuit 21 is closed to inhibit said writing pulse signals PS.

Figure 4:
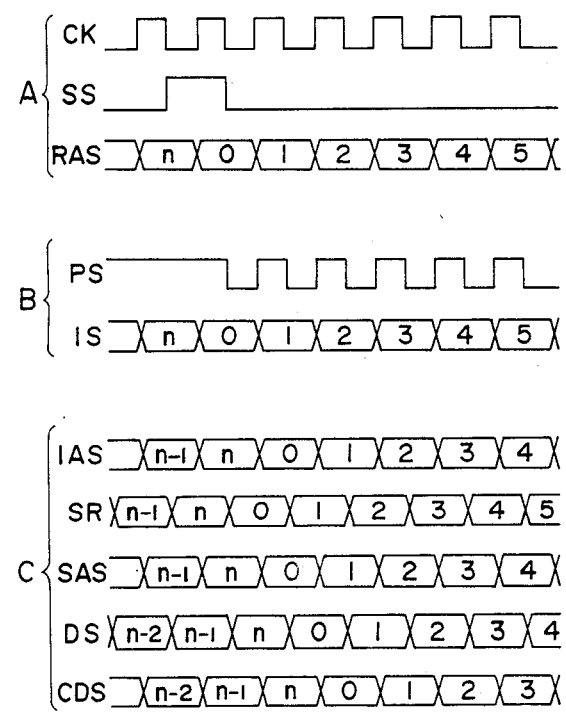
FIG. 4 is a timing chart showing the function of the circuit shown in FIG. 3.

Now reference is made to FIG. 4 for explaining the function of the circuit shown in FIG. 3. FIG. 4 is divided into three parts A, B and C, of which A and B in combination indicate the timing of writing the shading correction signals into the RAM 24 while A and C in combination indicate the timing of reading the shading correction signals from the RAM 24.

At first there will be given an explanation of the part A.

A RAM address signal RAS is reset to zero in response to the synchronization signal SS and is then stepwise increased at the leading edge of each clock signal CK. The numerals "O"- "n" in the timing chart indicate the value and order of the RAM address signals RAS. It is to be noted that other numerals in the timing chart merely indicate the order of timing.

When the CCD 7 is positioned at the shading correction plate 1, an unrepresented controller sends a "write-in" signal to the switching circuit 23 to initiate the write-in of the shading correction signals SR into the RAM 24. On the other hand, during the shading correction by reading the shading correction signals SR from the RAM 24 (represented by the combination A and C), said controller sends a "read-out" signal to the switching circuit 23.

Now there will be given an explanation of the part B in FIG. 4.

In response to the "write-in" signal supplied by the unrepresented controller to the switching circuit 23, said circuit releases, by a control signal CS synchronized with the synchronization signal SS, write-in pulses to the RAM 24 for a cycle, namely from said synchronization signal SS to a succeeding synchronization signal SS. In this state the CCD 7 is positioned at the shading correction plate 1, so that the shading correction signals SR corresponding to the pixels of the CCD 7 are stored in the RAM 24.

Now there will be given an explanation of the part C of FIG. 4, indicating the function during the supply of a "read-out" signal from the unrepresented controller to the switching circuit 23, namely during the shading correction process. In this state the CCD 7 reads the original document placed face down on the carriage glass 9.

The image signals IS are changed to output signals IAS by a delay of one clock pulse in the timing circuit 20 as shown in part C in FIG. 4. The shading correction signals SR are read from the RAM 24, after the delay time thereof, by address signals RAS corresponding to the reading positions of the image signals IS, and are delayed as output signals SAS in the timing circuit 22 in order to be synchronized with the driving clock signals CK. The output signals IAS, SAS of the timing circuits 20, 22 are supplied to the address ports of the ROM 25 to read previously stored corrected data DS, which are released as corrected image signals CDS after timing control in the timing circuit 29.

The ROM 25 stores corrected data DS at addresses to be determined by the values of the image signals IS and of the shading correction signals SR. The value of said corrected data can be selected as an experimental value to be optimum for a combination for example of the shading correction signal SR and the image signal IS. Naturally there may be employed theoretical values conventionally proposed according to shading correction processes.

Now there will be given a more detailed explanation of the data to be stored in the ROM 25.

It is assumed that the ROM 25 is composed, as explained before, of bipolar PROM, TBP28S86 manufactured by Texas Instruments. It has a capacity of 2K×8 bits, with 11 address signal lines and 8 data signal lines. Among said 11 address lines of the ROM 25, 6 bits are allotted to the image signals IS, 4 bits to the shading correction signals SR, and 1 bit for selecting either of two different stored processing data. Said selection may be conducted manually or automatically with a switch or with a microcomputer or the like.

In the present embodiment, of the 8-bit data signal lines of the ROM 25, only the lower 6 bits are used since the corrected data DS are of 6-bit structure.

Figure 5:
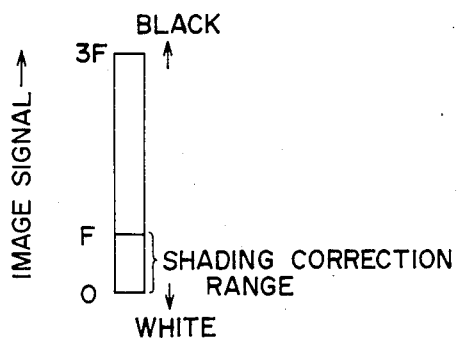
FIG. 5 is an explanatory chart showing the range of shading correction.

FIG. 5 schematically shows the relation between the value of the image signal IS and the shading correction range.

The values "3F" and "00" of the image signal, in hexadecimal representation, respectively correspond to black and white levels. The shading correction in the present embodiment is conducted on an assumption that a white level output signal obtained by reading the shading correction plate 1 is always positioned within a shading correction range shown in FIG. 5. In this manner it is therefore rendered possible to allot 6 bits of the address lines of the ROM 25 to the image signals IS and 4 bits to the shading correction signals SR.

The shading correction signals SR are obtained by storing the lower 4 bits alone of the image signals IS into the RAM 24, while the upper 2 bits are regarded as zero. The shading correction range can be expanded to the entire range of values 0-3F of the image signal shown in FIG. 5 if 6 bits are allotted to the shading correction signals SR in the same manner as in the image signals IS, but such an arrangement will require two additional address lines in the ROM 25 and thus will lead to an increase in the capacity of the ROM 25. The shading correction range of the present embodiment is sufficient practically and is advantageous in cost as the actual range is not wide as such. It is however possible also to store the entire 6 bits of the image signals in the RAM 24 and to adopt 4 bits thereof as the shading correction signals at the signal read-out from the RAM 24.

The corrected data DS to be stored in the ROM 25 are for example given by the following formula:

$$Z = INT[63 - (63-X) \times 63 \div (63-Y)] \quad (1)$$

wherein:
X: image signal (0 - 63)
Y: shading correction signal (0 - 15)
Z: corrected image signal (0 - 63)

According to the foregoing formula, a shading correction signal SR obtained by reading the shading correction plate 1 is taken as a whitest level W in the corresponding pixel, and the image signal, which assumes a value within a range from W to 63, is converted to a range from 0 to 63 by multiplication based on said shading correction signals SR. It is to be noted that Z is selected equal to zero in the case of X<Y even though Z<0 according to the equation (1).

Figure 6:
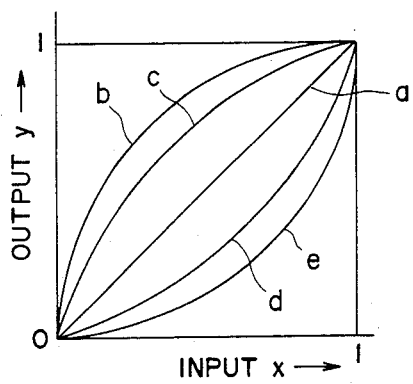
FIGS. 6 and 7 are charts showing correction functions.
Figure 7:
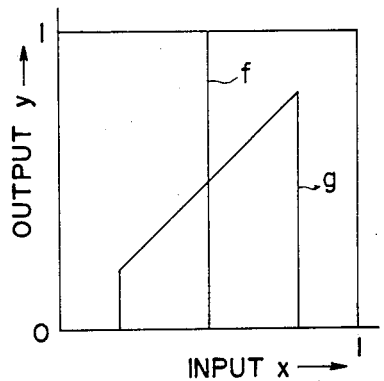

FIGS. 6 and 7 show examples of functions for applying further correction to the value Z obtained according to the equation (1), wherein each function is represented by:

$$y = Fn(x) \quad (2).$$

A function Fa represented by a linear curve as shown in FIG. 6 corresponds to the equation (1). In FIG. 6, functions Fb, Fc, Fd and Fe respectively represented by lines b, c, d and e are used for further correction of the signals corrected according to the equation (1) in consideration of the characteristic of the visual observation and of the light source, and for improving the reproducibility of the original document.

A line f shown in FIG. 7 indicates a function Of in which the effect of digitization is taken into consideration. In this case the use of plural bits for the output of the ROM 25 is almost meaningless since the output can only assume either of two values "0" and "1". It is however possible to effect an operation corresponding to the control of the slice level at digitization by allotting the functions Of with different changeover points of variable y from "0" to "1" to different output bits of the ROM 25. Consequently the shading correction circuit shown in FIG. 3 can also perform the function of a digitizing circuit if such functions Of are stored in the ROM 25.

A line g in FIG. 7 represents a function Fg for transmitting only the signals of an intermediate range. According to the present invention, special functions which generally require complex processing circuits can also be easily realized by modifying the content of the ROM 25.

FIG. 8 shows an example of the memory map of the ROM 25. In the address of the ROM 25, the uppermost bit is used as an input signal S for selecting the processing method, the next 4 bits are used as the input Y for the shading correction signals SR, and the succeeding 6 bits are used as the input X of the image signals IS to be subjected to shading correction. The output Z of the corrected image signals assumes a value in the range from 0 to 63 by taking 6 lower bits of the 8 output bits of the ROM 25, and disregarding the upper 2 bits. It is to be noted that all figures in FIG. 8 are in hexadecimal representation.

FIG. 8 shows an example of figures corresponding to the equation (1) for a case of the selecting input signal S=0 and of figures corresponding to a curve b or c shown in FIG. 6 for a case of S=1. The function for the case S=1 is given by:

$$Z = INT[63 \times \{63 - (X-63) \div (63-Y)\}] \quad (3).$$

In the foregoing embodiment the image signals are stored directly in the RAM 24, but it is also possible, for example, to sample the image signals plural times and to employ the average values of thus sampled signals as the shading correction signals SR in order to stabilize the function.

Furthermore, it is possible to group neighboring plural photoelectric converting elements of CCD and to apply shading correction collectively to such grouped photoelectric converting elements. The storage of the shading correction signals into the RAM 24 may be conducted at every original scanning, or may be conducted after scanning of plural originals. Furthermore, if the light source and other components are reasonably stable, the shading correction signals can be read at the start of the apparatus, for example by the start of power supply, need not be renewed thereafter at every original scanning.

As explained in the foregoing, the present invention allows the shading correcting operation merely by modifying the content of a read-only memory and enables also complex data processing without any increase in cost.

Also the use of timing circuits in various parts of the circuit ensures stable operation by coping with fluctuation in the access time of the random access memory and read-only memory.

In addition, the shading correction circuit of the present invention can also have the function of a digitizing circuit, and achieves high-speed stable signal processing through entirely digital shading correction.

Furthermore, the shading correction of the present invention can satisfactorily met the requirement of high-speed image processing, and can ensure satisfactory image reproduction even, for example, in a digital copier for which a high speed and intermediate tone reproduction are required.

The dimension of the processing circuit and the memory capacity can be reduced since the shading correction signals required for shading correction can be of a number of bits smaller than the number of bits of the signals obtained by reading the original.

What I claim is:

1. An image reading apparatus, comprising:

reading means for photoelectrically reading an image and generating image data representing the image;

a reference portion for use in correcting a shading in the image data generated by said reading means;

first memory means for storing image data generated from said reading means when said reading means reads said reference portion;

second memory means having a plurality of addresses, said second memory means being for storing first and second sets of corrected image data, said first and second sets respectively comprising first corrected image data and second corrected image data are respectively associated with the same address data, said first set of corrected image data being data which have been corrected taking into account correction of shading in the image data only, said second set of corrected image data being data which have been corrected taking into account correction not only of shading in the image data but also of a characteristic of visual observation, and the first or second corrected image data being read out in accordance with said address data which is supplied to said second memory means; and read out means for supplying to said second memory means, in combination, as the address data, image data generated from said reading means when said reading means reads an original document and the image data stored in said first memory means, and for reading out corrected image data of either said first or said second set of corrected image data from said second memory means.

2. An image reading apparatus according to claim 1, wherein said read out means is operable to read out the image data from said first memory means in synchronism with the reading by said reading means of the original document.

3. An image reading apparatus according to claim 1, wherein said reading means includes photoelectric conversion means for forming an analog image signal according to intensity of light incident on said reading means, and analog-digital conversion means for converting the analog image signal into digital image data.

4. An image reading apparatus according to claim 3, wherein the digital image data from said analog-digital conversion means comprises a plurality of bits and said first memory means is adapted to store selected ones of those bits.

5. An image reading apparatus according to claim 1, wherein said reading means includes light source means for illuminating said reference portion and for illuminating the original document.

6. An image reading apparatus according to claim 1, wherein said read out means supplies to said second memory means selection data to select, for reading out, said first or said second set of corrected image data.

7. An image reading apparatus according to claim 1, further comprising a platen for supporting at a predetermined area the original document to be read, wherein said reference portion is provided outside of said predetermined area of said platen.

8. An image reading apparatus according to claim 4, wherein said first memory means is so arranged that the selected bits stored therein are bits obtained from said reading means by reading of said reference portion by said reading means.

* * * * *